(12) United States Patent
Smee et al.

(10) Patent No.: US 7,792,184 B2
(45) Date of Patent: Sep. 7, 2010

(54) APPARATUS AND METHOD FOR DETERMINING COEFFICIENT OF AN EQUALIZER

(75) Inventors: John E. Smee, San Diego, CA (US); Haitao Zhang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 686 days.

(21) Appl. No.: 10/423,234

(22) Filed: Apr. 24, 2003

(65) Prior Publication Data

US 2004/0213339 A1 Oct. 28, 2004

(51) Int. Cl.
H04B 13/02 (2006.01)

(52) U.S. Cl. ............ 375/232; 375/144; 375/231; 375/233; 708/323; 708/404; 708/420

(58) Field of Classification Search ......... 375/229–236, 375/219, 222, 346, 350, 130, 131, 134, 140, 375/136, 142, 144, 148, 150, 152, 347, 349, 375/226; 708/322, 323, 404, 5, 315, 420, 708/425; 370/252; 382/100; 704/216, 226
See application file for complete search history.

(56) References Cited

U.S. PATENT DOCUMENTS

| | | | | |
|---|---|---|---|---|
| 3,614,673 | A | 10/1971 | Kang et al. ............... 333/18 |
| 5,796,814 | A | 8/1998 | Brajal et al. ............ 375/232 |
| 5,822,368 | A * | 10/1998 | Wang ...................... 375/229 |
| 6,259,729 | B1 * | 7/2001 | Seki ....................... 375/231 |
| 6,359,999 | B1 * | 3/2002 | Moriwaki et al. ........ 382/100 |
| 6,771,591 | B1 * | 8/2004 | Belotserkovsky et al. ... 370/210 |
| 6,947,387 | B1 * | 9/2005 | Saw ........................ 370/252 |
| 7,099,299 | B2 * | 8/2006 | Liang et al. ............. 370/342 |

| | | | | |
|---|---|---|---|---|
| 2002/0126741 | A1 * | 9/2002 | Baum et al. ............ 375/144 |
| 2003/0007554 | A1 * | 1/2003 | Birru ...................... 375/233 |

(Continued)

FOREIGN PATENT DOCUMENTS

DE 4016947 5/1990

(Continued)

OTHER PUBLICATIONS

International Search Report—PCT/US2004/012581, International Searching Authority—European Patent Office—Sep. 13, 2004.

(Continued)

*Primary Examiner*—David C Payne
*Assistant Examiner*—Rahel Guarino
(74) *Attorney, Agent, or Firm*—Donald C. Kordich; Larry J. Moskowitz (57) ABSTRACT

The linear equalizer (LE) coefficients for code-division-multiplexed (CDM) pilot systems can be determined based upon frequency-domain calculations involving channel impulse responses. A channel impulse response can be formed at the mobile terminal by suitably filtering and despreading the received baseband signal with respect to the pilot Walsh channel. The channel frequency response is then determined based on the fast Fourier transform (FFT) of the channel impulse response. Frequency-domain equalizer coefficients can be determined from the channel frequency response. The frequency-domain equalizer coefficient can be utilized to determine time-domain equalizer coefficients to implement the equalizer in time domain, or be utilized to implement the equalizer in frequency domain.

26 Claims, 5 Drawing Sheets

U.S. PATENT DOCUMENTS

2004/0091034 A1 * 5/2004 Shiu et al. .................... 375/227
2004/0186710 A1 * 9/2004 Yang .......................... 704/226

FOREIGN PATENT DOCUMENTS

| DE | 10111496 A1 * | 9/2001 |
|---|---|---|
| DE | 10111496 | 3/2002 |
| EP | 0588783 | 9/1993 |

OTHER PUBLICATIONS

Written Opinion—PCT/US2004/012581, International Searching Authority—European Patent Office—Sep. 13, 2004.

International Preliminary Report on Patentability—PCT/US2004/012581, International Preliminary Examining Authority/US—Alexandria, Virginia—Feb. 8, 2005.

* cited by examiner

STRUCTURE OF CHIPX2 LINEAR EQUALIZER.
FIG. 1

EXAMPLE OF CHANNEL ESTIMATE VECTOR $\underline{h}$.
FIG. 2

FIG. 3

TIME-DOMAIN CHANNEL, RESULTING TIME-DOMAIN EQUALIZER, AND RESULTING EQUALIZED IMPULSE RESPONSE.

FIG. 4

MAGNITUDE OF CHANNEL RESPONSE, MAGNITUDE OF EQUALIZER RESPONSE, MAGNITUDE OF DOWNSAMPLED EQUALIZED RESPONSE.

APPARATUS AND METHOD FOR DETERMINING COEFFICIENT OF AN EQUALIZER

BACKGROUND

1. Field

The present invention relates generally to wireless communications, and more specifically to equalizers.

2. Background

For Code-Division Multiple-Access (CDMA) systems such as IS-856 (also referred to as High Data Rate (HDR)), cdma2000, and wideband CDMA (W-CDMA) it is desirable to implement a linear equalizer (LE) at the mobile terminal. The LE can mitigate the intersymbol interference (ISI) arising from multipath propagation and imperfect filtering on the forward link from the base station to the mobile terminal. A challenge for implementing a LE is determining the equalizer coefficients.

In the forward link of the HDR system, pilot symbols known to the receiver are transmitted at full power during a predetermined portion and interval of a transmission frame. This is referred to as a time-division-multiplexed (TDM) pilot. The receiver can tune to the pilot symbol interval. The algorithms that adapt the equalizer coefficients to their desired values are often based on the criteria of minimizing mean square error (MMSE) between the known pilot symbols and the equalizer's channel impulse responses of these pilot symbols. Two common examples of adaptive MMSE algorithms are the least-mean-square (LMS) algorithm and the recursive-least-squares (RLS) algorithm.

In the forward link of the cdma2000 system and the High Speed Packet Data Access (HSPDA) of W-CDMA, however, the pilot symbols are continuously transmitted on a pilot Walsh channel that is orthogonal to the Walsh channels being used for data transmission. This is referred to as a code-division-multiplexed (CDM) pilot. There is no specific interval when the pilot symbols are sent. This makes it difficult to determine the equalizer coefficients in CDM pilot systems. In CDM pilot systems, the convergence and tracking behavior of the LMS and RLS algorithms may suffer relative to TDM pilot systems.

Thus a need exists for improving the channel impulse response of the equalizer coefficients.

SUMMARY

The LE coefficients for CDM and TDM pilot systems can be determined based upon frequency-domain calculations involving channel impulse responses. For CDM pilot systems, a channel impulse response can be formed at the mobile terminal by suitably filtering and despreading the received baseband signal with respect to the pilot Walsh channel. For TDM pilot systems, the channel impulse response can be determined using well-known estimation techniques during the pilot period. The channel frequency impulse is then determined based on the fast Fourier transform (FFT) of the channel impulse response. The LE coefficients determined based on frequency-domain calculations can then be used to implement the equalizer in either time domain or frequency domain. These techniques can be used to not only reduce ISI but also to reduce intersector interference.

DETAILED DESCRIPTION

Figure 1:
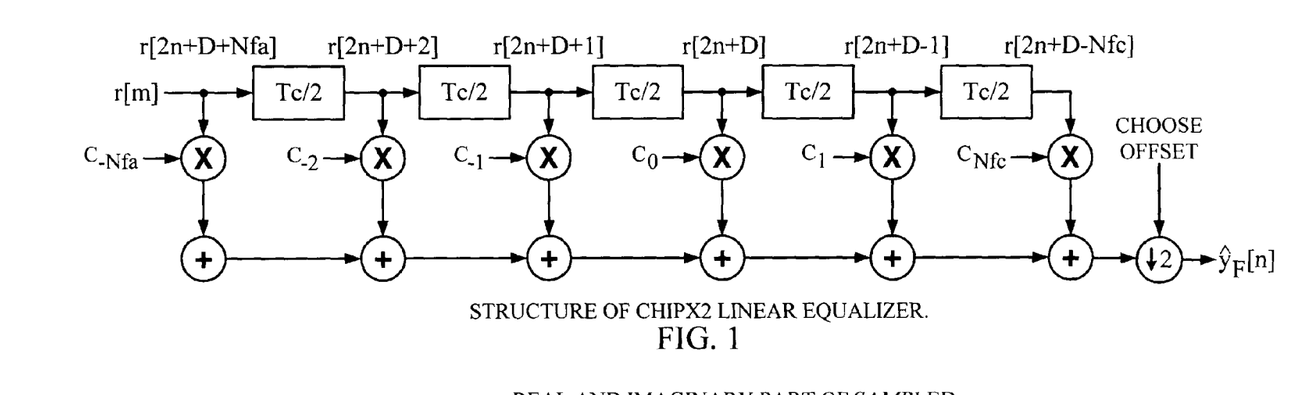
FIG. 1 is a generalized block diagram illustrating the structure of an exemplary embodiment of a time-domain linear equalizer.

FIG. 1 is a generalized block diagram illustrating the structure of an exemplary embodiment of a time-domain linear equalizer. The LE structure is a tapped-delay line finite-impulse response (FIR) filter that processes the baseband samples at the receiver of the mobile terminal.

The LE output can be represented as:

$$\hat{y}_F[n] = \sum_{m=-Nfa}^{Nfc} (c_m)^* r[2n + D - m]. \quad (1)$$

The LE can have Nfa+Nfc+1 taps. Denoting the main (cursor) tap by the index m=0, the equalizer has Nfa anti-causal taps (that is, coefficients which multiply the signal samples that come after the cursor sample) and Nfc causal taps (that is, coefficients which multiply signal samples that come before the cursor sample). With continuous time complex baseband received stream r(t), the ChipX2 samples can be defined as r[m]=r(mTc/2). The transmitted chipX1 stream index can be y[n]. The delay parameter D can be chosen to specify the cursor position, typically based on the channel impulse response, so that, with the proper decimation offset from ChipX2 to ChipX1 at the LE output, the detection of the nth transmitted chip is based on the main tap multiplied by the desired ChipX2 received sample. The mth equalizer coefficient is denoted by $c_m$. The output of the LE can be represented as follows:

$$\hat{y}_F[n] = c_o^* r[2n+D] + \text{other terms}. \quad (2)$$

If the communications channel had no ISI, then only the cursor tap would be required to demodulate the frame correctly.

Channel Model

The baseband channel model h(t) can be defined to include the effects of the transmitter filter, multipath channel, and receiver filter. Accounting for the transmitted ChipX1 chip stream y[n] and additive noise z(t), the received baseband signal can be represented as follows:

$$r(t) = \sum_n y[n] h(t - nTc) + z(t). \quad (3)$$

Because the receiver can operate at ChipX2, r[m]=r(mTc/2), z[m]=z(mTc/2), and h[m]=h(mTc/2), the input, time-domain received samples, to the LE can be represented as follows:

$$r[m] = \sum_n y[n]h[m-2n] + z[m]. \quad (4)$$

The additive noise power can be assumed as $N_0$.

The ChipX2 channel impulse response of the channel impulse response can be represented as follows:

$$\underline{h} = \begin{bmatrix} h[1] \\ h[2] \\ M \\ h[L] \end{bmatrix}. \quad (5)$$

L represents the number of chipX2 samples in the channel impulse response.

Figure 2:
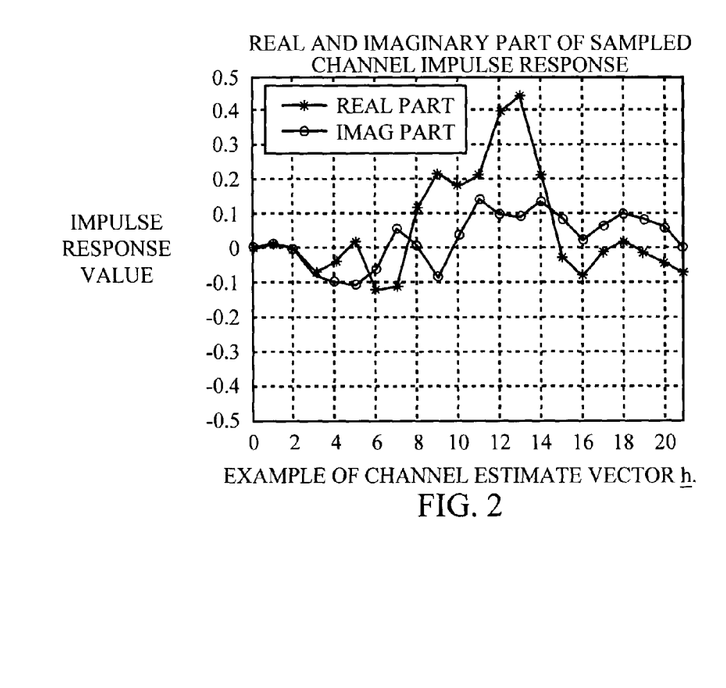
FIG. 2 is a chart illustrating the real and imaginary parts of an exemplary channel impulse response $\underline{h}$.

FIG. 2 is a chart illustrating the real and imaginary parts of an exemplary channel impulse response $\underline{h}$.

Based on the channel impulse response $\underline{h}$, the chip level timing can be specified. To determine the chip level timing based on $\underline{h}$, the "cursor" is defined. As shown in FIG. 2, the sample index 13 can be used because it has the largest energy (that is, $I^2+Q^2$). This cursor index is referred to as D. For a fixed number of LE taps (NFa+NFc+1), the coefficient values would be different for different values of NFa and NFc. The choice of NFa, NFc, and D affect the performance of short equalizers. For linear equalizers, it is common to choose NFa=NFc.

A channel impulse response can be formed at the mobile terminal for CDM pilot systems by suitably filtering and despreading the received baseband signal with respect to the pilot Walsh channel. This vector represents the combined effect of the transmit filtering, receive filtering, and propagation channel. For TDM pilot systems, the channel impulse response can be determined during the pilot period by well known estimation techniques.

Calculation of MMSE LE Based on the Channel Frequency Response

For a ChipX2 linear equalizer, the channel impulse response is a complex vector $\underline{h}$ spaced at ChipX2. By taking the Fourier transform (in practice the FFT) of $\underline{h}$, the channel frequency response H(f) results. For example, if $\underline{h}$ is of length sixteen (spanning eight chips) then the vector H can be calculated by a sixteen-point FFT, and hence H is also of length sixteen. The channel frequency response can be represented as follows:

$$H(f)=FFT(\underline{h}). \quad (6)$$

Typically the noise present in the baseband samples operated on by the equalizer can be colored by the fixed receiver filter that precedes the equalizer.

If the additive noise is assumed as white with power $N_0$, the frequency response C(f) of the MMSE adjusted fractionally-spaced linear equalizer can be represented as follows:

$$C(f) = \frac{H^*(f)}{\frac{1}{T}\sum_k |H(f+k/T)|^2 + N_0}, \quad (7)$$

where, $$H_{folded}(f) = \frac{1}{T}\sum_k |H(f+k/T)|^2 \quad (8)$$

and can be referred to as the folded spectrum of H(f), H*(f) is a complex conjugate of the determined channel frequency response, k is integers, T is a chip or symbol period, $N_0$ is a power of additive noise, and H is the determined channel frequency response at a particular frequency f, k, and T.

Because all the vectors can be of length sixteen in this example, then the arithmetic for C(f) can be computed at those sixteen discrete frequencies. The sixteen values of the sixteen-point FFT H(f) can be represented as follows:

$$H[m] \text{ for } m=1, 2, \ldots, 16. \quad (9)$$

For this example with the channel impulse response being sampled at ChipX2 and the channel frequency response based on a sixteen-point FFT, the folded spectrum of H(f) can be represented as follows:

$$H_{folded}[m] = \frac{1}{2}|H[m]|^2 + \frac{1}{2}|H[m+8]|^2 \quad (10)$$

for $m = 1, 2, \ldots, 8$ and $$H_{folded}[m] = H_{folded}[m-8] \quad (11)$$

for $m = 9, 10, \ldots, 16$.

Given the values for H[m] and the noise power $N_0$, the equalizer frequency response can be determined by evaluating the above expression for each element of the vector H, giving an equalizer coefficient vector C. In this example, the vector is of length sixteen.

When the denominator is dominated by the noise term at low signal-to-noise ratio (SNR), the LE response C(f) resembles the matched filter H*(f). At high SNR when the noise term is negligible, the LE response C(f) resembles the inverse of H(f), that is, the zero-forcing LE.

Based on the frequency-domain equalizer vector C(f), the time-domain LE coefficients can be determined based on the inverse Fourier transform. In practice, an inverse fast Fourier Transform (IFFT) can be used as follows:

$$c=IFFT(C(f)). \quad (12)$$

These time-domain coefficients can then be applied to the FIR operation as shown in FIG. 1. The time-domain coefficient vector can be truncated to implement the desired number of FIR coefficients.

The LE output can also be computed in the frequency domain by taking the FFT of the baseband samples, multiplying the result by C(f), and then taking the IFFT to give the time-domain chip channel impulse responses.

Example of Channel Equalization for Sixteen-Point FFT

The following example for time-domain channel equalization is based on the FFT technique. The steps are as follows:

(1) Determine channel impulse response $\underline{h}$.

(2) Determine the FFT of the channel impulse response to obtain the remainder of the receiver chain.

(3) Determine the frequency-domain equalizer coefficients C based on H and $N_0$ using Equation (7) above.

(4) Determine time-domain equalizer coefficients c=IFFT(C) to implement the equalizer in time domain, or use the frequency domain equalizer coefficients to implement the equalizer in frequency domain.

Figure 5:
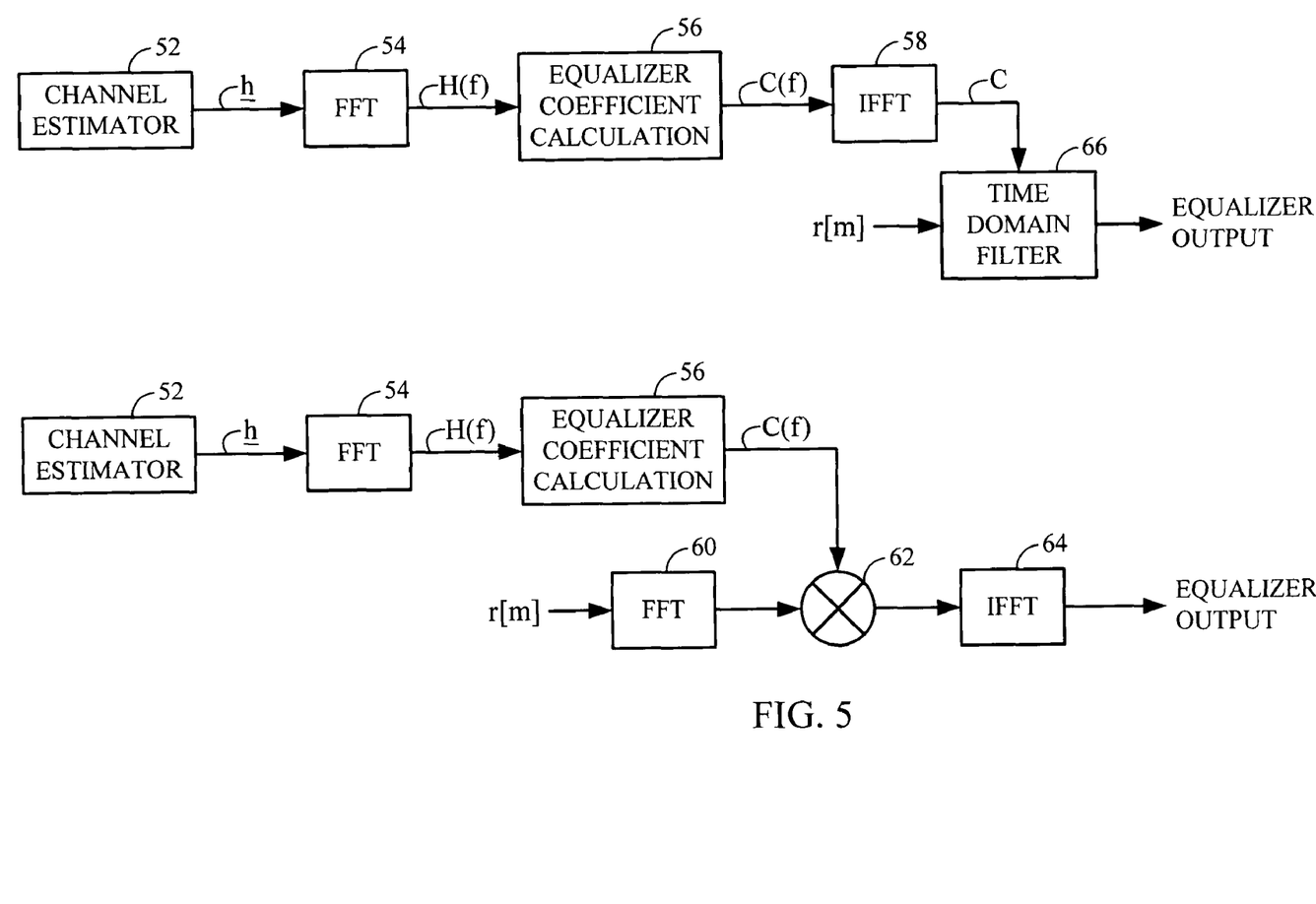
FIG. 5 is generalized block diagrams for carrying out channel equalization in the time domain and the frequency domain.
Figure 6:
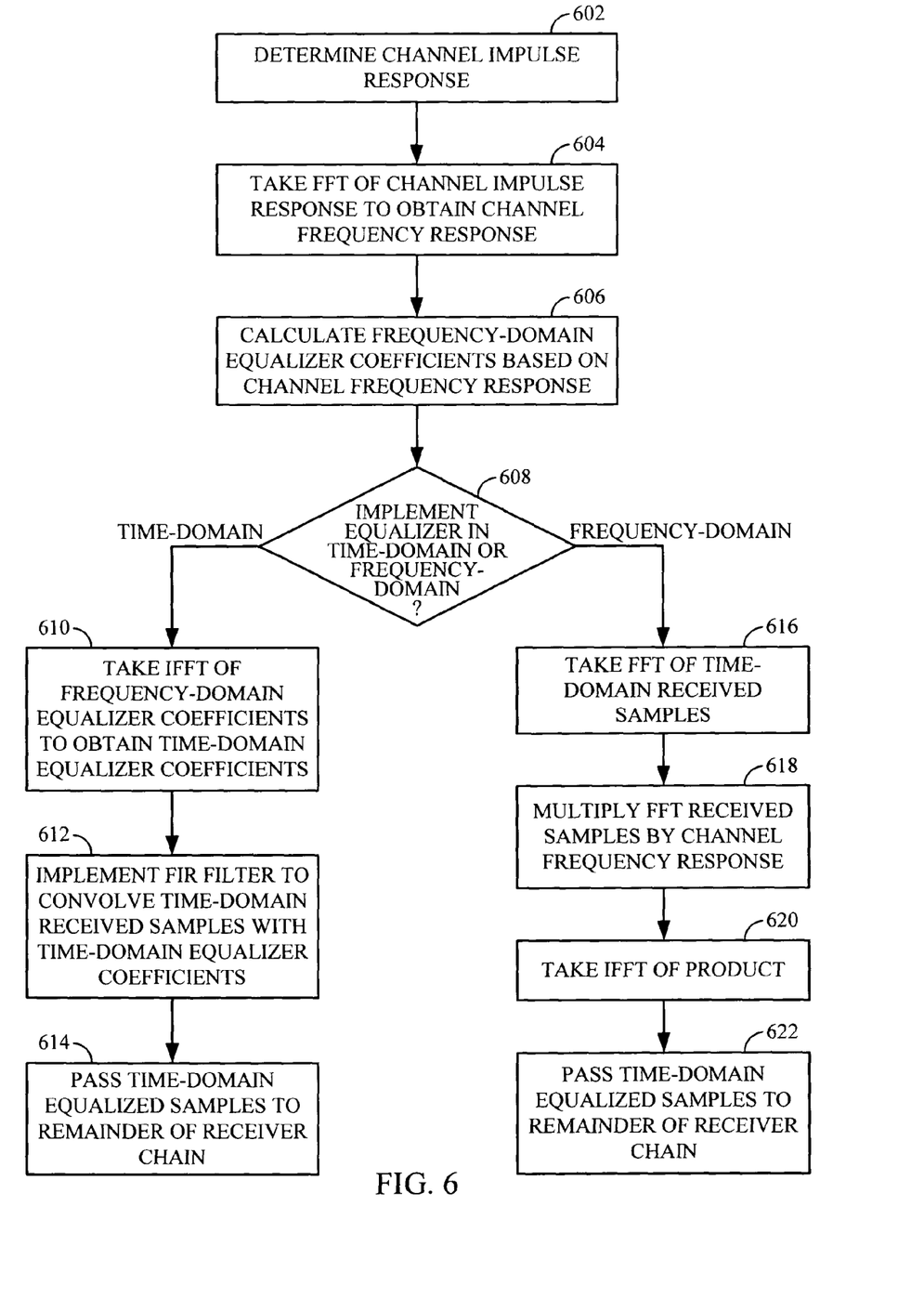
FIG. 6 is a flow chart for carrying out channel equalization based upon the FFT.

FIG. 5 illustrates generalized block diagrams for carrying out this operation, and FIG. 6 illustrates a flow chart for carrying out this operation. At 602, a pre-processor, or channel estimator, 52 outputs a channel impulse response h. At 604, an FFT circuit 54 converts the channel impulse into the channel frequency response H(f). At 606, an equalizer coefficient calculation circuit 56 converts the channel frequency response to frequency-domain equalizer coefficients C(f) using MMSE techniques. Optionally, at 608, a decision is made whether to implement the equalizer in time domain or frequency domain.

If the decision is to implement the equalizer in the time domain, at 610, an IFFT circuit 58 converts the frequency-domain equalizer coefficients to time-domain equalizer coefficients c. At 612, a FIR filter 66, such as the one shown in FIG. 1, can convolve the time-domain received samples r[m] with the time-domain equalizer coefficients. At 614, the equalizer passes the time-domain equalized samples to the remainder of the receiver chain.

If the decision is to implement the equalizer in the frequency domain, at 616, an FFT circuit 60 performs an FFT of the time-domain received samples r[m]. At 618, a multiplier circuit 62 multiplies the FFT received samples by the channel frequency response to obtain a product. At 620, an IFFT circuit 66 converts the product to obtain the time-domain equalized samples. At 622, the equalizer passes the time-domain equalized samples to the remainder of the receiver chain.

Figure 3:
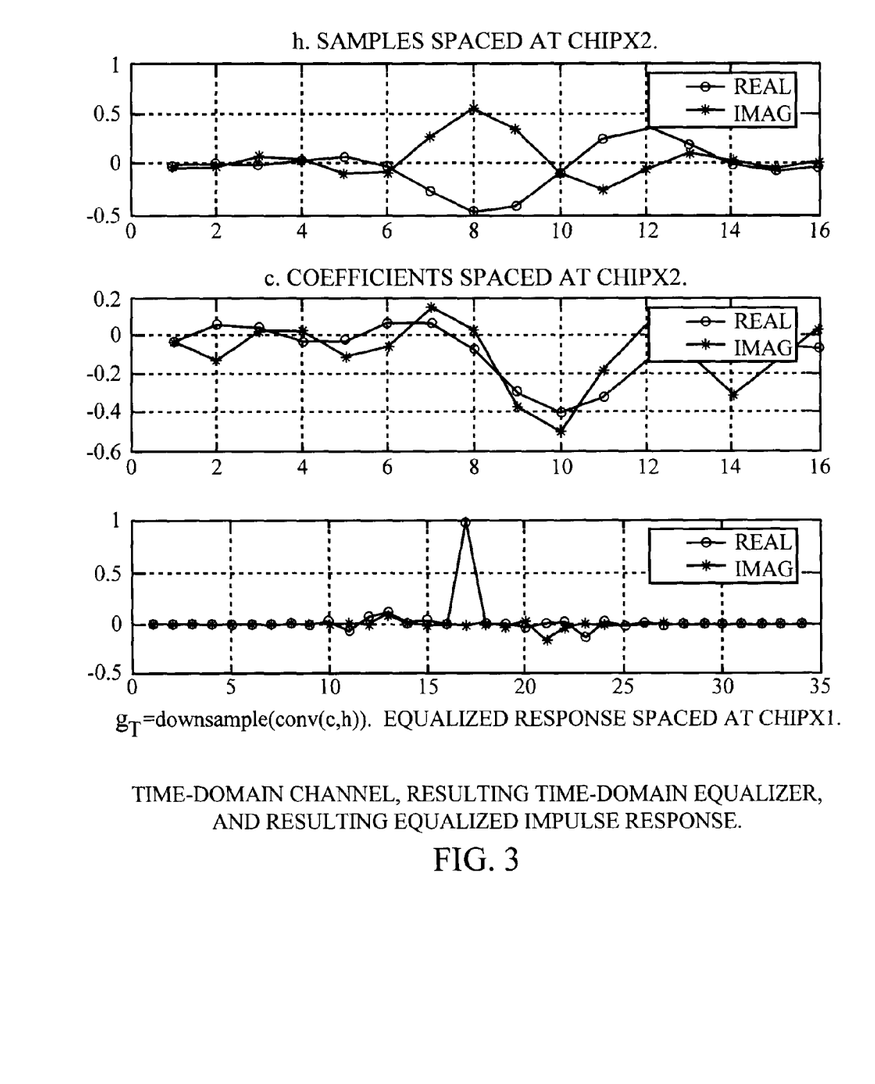
FIG. 3 is charts illustrating results of an exemplary channel equalization based on FFT techniques.

FIG. 3 is charts illustrating results of an exemplary channel equalization based on FFT techniques.

Based on the ChipX2 channel impulse response h (top chart) and time-domain equalizer coefficient c=IFFT (C) (middle chart), the equalized ChipX2 equalized response can be defined as g=conv(c,h). Because the output of the equalizer is sampled at ChipX1, when the equalizer is spaced at ChipX2, the residual ISI is based on the ChipX1 impulse response $g_T$=downsample(g). The bottom chart of FIG. 3 shows that the equalized channel impulse response has little ISI.

In the frequency domain, the equalized channel frequency response can be defined as G(f)=C(f)H(f) and the frequency response of the down-sampled equalizer output can be expressed as follows:

$$G_T(f) = \frac{1}{T}\sum_k G(f+k/T). \tag{13}$$

Figure 4:
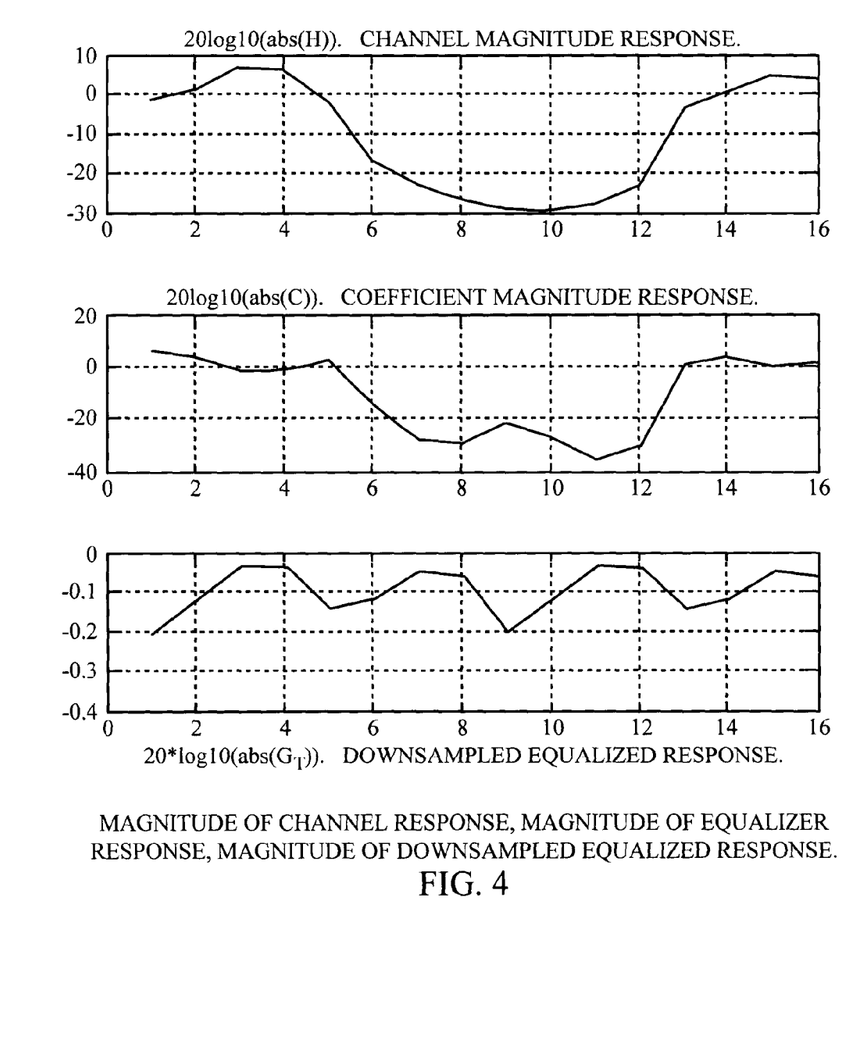
FIG. 4 is charts illustrating channel frequency response magnitude, equalizer response magnitude, and the down-sampled equalizer output magnitude.

FIG. 4 is charts illustrating channel frequency response magnitude (top chart), equalizer response magnitude (middle chart), and the down sampled equalizer output magnitude (bottom chart).

The results shown in FIG. 4 are for simulations at an SNR of 20 dB. The equalizer response is similar to the inverse of the channel response. As seen from the y-axis scale of the bottom chart, the down-sampled equalized response is close to flat.

Effects from Intersector Interference for the Forward Link in Cellular Systems

Consider a cellular communications system such as a deployment of a version of cdma2000 referred to as cdma2000 1×EV-DV. "1×" refers to the spreading rate, "EV" refers to an evolution of cdma2000, and "DV" refers to the capability to transmit not only voice but also data at a high data rate over a forward-link dedicated channel.

On the forward packet data channel, the mobile terminal can receive the transmission from its serving sector base station transceiver system (BTS) as well as interference from transmissions from other sectors. Similar to the IS-856 forward link, there is no soft-handoff for the 1×EV-DV forward link packet data channel, and so transmissions from the non-serving sector are interference to the mobile receiver.

The serving sector can be denoted as Sector1. The two largest interfering sectors can be dented as Sector2 and Sector3. At the mobile terminal, channel impulse responses can be calculated by de-spreading the pilot channels for the serving and non-serving sectors. The channel impulse response of the channel from the serving sector BTS to mobile terminal can be denoted as $\underline{h}_1$. The channel impulse response of the channel from the strongest interfering sector BTS to mobile terminal cam be denoted as $\underline{h}_2$. The channel impulse response of the channel from the second strongest interfering sector BTS to mobile terminal can be denoted as $\underline{h}_3$. By taking the FFT of these three channel impulse responses, the following channel frequency responses of the sectors can be expressed as follows:

$$H_1(f)=FFT(\underline{h}_1) \tag{14}$$

$$H_2(f)=FFT(\underline{h}_2)$$

$$H_3(f)=FFT(\underline{h}_3)$$

The power of the remaining interference terms can be denoted as $N_0$. The frequency response of the MMSE fractionally-spaced linear equalizer for the mobile terminal can then be calculated by the following:

$$C(f) = \frac{H_1^*(f)}{\frac{1}{T}\sum_k (|H_1(f+k/T)|^2 + |H_2(f+k/T)|^2 + |H_3(f+k/T)|^2) + N_0}, \tag{15}$$

where $H^*_1(f)$ is a complex conjugate of a channel frequency response for a serving sector, k is integers, T is a chip or symbol period, and $N_0$ is the power of additive noise, $H_1$ is a channel frequency response of the serving sector at a particular frequency f, k, and T, $H_2$ is a channel frequency response of an interfering sector at a particular frequency f, k, and T, and $H_3$ is a channel frequency response of another interfering sector at a particular frequency f, k, and T.

The equalizer frequency response C(f) will tend to be smaller when the folded spectrum of the interfering channels has a higher magnitude. To implement the equalizer in the time-domain, the LE coefficients can be determined based on the inverse Fourier transform as follows:

$$c=IFFT(C(f)). \tag{16}$$

These techniques can be extended to include a number of interfering sector transmissions. These techniques can also be extended to include a more accurate modeling of the correlation properties of the additive noise term based on the receiver filtering. These techniques can also be applied to multi-antenna mobile terminals, with each antenna having a corresponding equalizer, and the outputs of the equalizers can be combined. Also, each antenna can have a corresponding FFT circuit and MMSE circuit, and the outputs of the MMSE circuits can be combined and then input to a single IFFT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining coefficients of an equalizer, the method comprising the steps of:
    receiving a baseband signal to generate a received baseband signal, wherein the baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;
    despreading the received baseband signal with respect to the pilot channel to generate a despread baseband signal;
    determining a channel frequency response of a channel impulse response responsive to the despread baseband signal;
    determining frequency-domain equalizer coefficients based upon the determined channel frequency response;
    determining time-domain equalizer coefficients based upon the determined frequency-domain equalizer coefficients; and
    convolving time-domain received samples with the time-domain equalizer coefficients.

2. The method of claim 1, wherein the step of determining time-domain equalizer coefficients based upon the frequency-domain equalizer coefficients comprises:
    inverse fast Fourier transforming the determined frequency-domain equalizer coefficients.

3. The method of claim 1, wherein the step of determining a channel frequency response of a channel impulse response comprises the step of:
    fast Fourier transforming the channel impulse response.

4. The method of claim 1, wherein the step of determining frequency-domain equalizer coefficients based upon the determined channel frequency response can be expressed as follows:

$$C(f) = \frac{H^*(f)}{\frac{1}{T}\sum_k |H(f+k/T)|^2 + N_0},$$

where $H^*(f)$ is a complex conjugate of the determined channel frequency response, k is integers, T is a chip or symbol period, $N_0$ is a power of additive noise, and H is the determined channel frequency response at a particular frequency f, k, and T.

5. The method of claim 1,
    wherein the pilot channel is a pilot Walsh channel, and
    wherein the data channels are data Walsh channels.

6. The method of claim 1,
    wherein the pilot symbols are continuously received over the pilot channel.

7. The method of claim 6,
    wherein the pilot channel is a pilot Walsh channel, and
    wherein the data channels are data Walsh channels.

8. A method for determining coefficients of an equalizer, the method comprising the steps of:
    receiving a baseband signal to generate a received baseband signal, wherein the baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;
    despreading the received baseband signal with respect to the pilot channel to generate a despread baseband signal;
    determining a channel frequency response of a channel impulse response responsive to the despread baseband signal; and
    determining frequency-domain equalizer coefficients based upon the determined channel frequency response,
    wherein the step of determining frequency-domain equalizer coefficients based upon the channel frequency response can be expressed as follows:

$$C(f) = \frac{H_1^*(f)}{\frac{1}{T}\sum_k (|H_1(f+k/T)|^2 + |H_2(f+k/T)|^2 + |H_3(f+k/T)|^2) + N_0},$$

where $H^*_1(f)$ is a complex conjugate of a channel frequency response for a serving sector, k is integers, T is a chip or symbol period, and $N_0$ is the power of additive noise, $H_1$ is a channel frequency response of the serving sector at a particular frequency f, k, and T, $H_2$ is a channel frequency response of an interfering sector at the particular frequency f, k, and T, and $H_3$ is a channel frequency response of another interfering sector at the particular frequency f, k, and T.

9. A method for determining coefficients of an equalizer, the method comprising the steps of:
    receiving a baseband signal to generate a received baseband signal, wherein the baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;
    despreading the received baseband signal with respect to the pilot channel to generate a despread baseband signal;
    determining a channel frequency response of a channel impulse response responsive to the despread baseband signal by performing a first fast Fourier transform on the channel impulse response;
    determining frequency-domain equalizer coefficients based upon the determined channel frequency response;
    performing a second fast Fourier transform on received samples to produce transformed samples;
    multiplying the transformed samples by the determined frequency-domain equalizer coefficients to obtain a product; and
    inverse fast Fourier transforming the product to obtain time-domain equalized samples.

10. An equalizer comprising:
    a first fast Fourier transform circuit configured to convert a channel impulse into a channel frequency response responsive to a despread baseband signal, wherein the despread baseband signal is a code division multiple access (CDMA) signal including pilot symbols and data symbols;

wherein the pilot symbols are received over a pilot channel, wherein the data symbols are received over data channels, and wherein a remote source transmits the pilot channel orthogonal to the data channels;

an equalizer coefficient calculation circuit configured to convert the channel frequency response to frequency-domain equalizer coefficients;

an inverse fast Fourier transform circuit configured to produce time-domain equalizer coefficients responsive to receiving the frequency-domain equalizer coefficients; and a finite-impulse response filter for convolving time-domain received samples with the time-domain equalizer coefficients to obtain time-domain equalized samples.

11. The equalizer of claim 10, wherein the equalizer coefficient calculation circuit is configured to convert the channel frequency response to frequency-domain equalizer coefficients according to the following expression:

$$C(f) = \frac{H^*(f)}{\frac{1}{T}\sum_k |H(f+k/T)|^2 + N_0},$$

where $H^*(f)$ is a complex conjugate of the determined channel frequency response, k is integers, T is a chip or symbol period, $N_0$ is a power of additive noise, and H is the determined channel frequency response at a particular frequency f, k, and T.

12. The equalizer of claim 10, wherein the pilot channel is a pilot Walsh channel, and wherein the data channels are data Walsh channels.

13. The equalizer of claim 10, wherein the pilot symbols are continuously received over the pilot channel.

14. The equalizer of claim 13, wherein the pilot channel is a pilot Walsh channel, and wherein the data channels are data Walsh channels.

15. An equalizer comprising:

a first fast Fourier transform circuit configured to convert a channel impulse into a channel frequency response responsive to a despread baseband signal, wherein the despread baseband signal is a code division multiple access (CDMA) signal including pilot symbols and data symbols;

wherein the pilot symbols are received over a pilot channel, wherein the data symbols are received over data channels, and wherein a remote source transmits the pilot channel orthogonal to the data channels;

an equalizer coefficient calculation circuit configured to convert the channel frequency response to frequency-domain equalizer coefficients;

a second fast Fourier transform circuit configured to perform a second fast Fourier transform of time-domain received samples;

a multiplier circuit configured to multiply the second fast Fourier transform of the time-domain received samples by the frequency domain equalizer coefficients to obtain a product; and an inverse fast Fourier transform circuit configured to convert the product to obtain time-domain equalized samples.

16. An equalizer comprising:

a first fast Fourier transform circuit configured to convert a channel impulse into a channel frequency response responsive to a despread baseband signal, wherein the despread baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;

an equalizer coefficient calculation circuit configured to convert the channel frequency response to frequency-domain equalizer coefficients; and an inverse fast Fourier transform circuit configured to produce time-domain equalizer coefficients responsive to receiving the frequency-domain equalizer coefficients, wherein the equalizer coefficient calculation circuit is configured to convert the channel frequency response to frequency-domain equalizer coefficients according to the following expression:

$$C(f) = \frac{H_1^*(f)}{\frac{1}{T}\sum_k \left(|H_1(f+k/T)|^2 + |H_2(f+k/T)|^2 + |H_3(f+k/T)|^2\right) + N_0},$$

where $H^*_1(f)$ is a complex conjugate of a channel frequency response for a serving sector, k is integers, T is a chip or symbol period, and $N_0$ is the power of additive noise, $H_1$ is a channel frequency response of the serving sector at a particular frequency f, k, and T, $H_2$ is a channel frequency response of an interfering sector at the particular frequency f, k, and T, and $H_3$ is a channel frequency response of another interfering sector at the particular frequency f, k, and T.

17. An equalizer comprising:

a first fast Fourier transform circuit configured to convert a channel impulse into a channel frequency response responsive to a despread baseband signal, wherein the despread baseband signal is a code division multiple access (CDMA) signal including pilot symbols and data symbols;

wherein the pilot symbols are received over a pilot channel, wherein the data symbols are received over data channels, and wherein a remote source transmits the pilot channel orthogonal to the data channels;

an equalizer coefficient calculation circuit configured to convert the channel frequency response to frequency-domain equalizer coefficients; and an inverse fast Fourier transform circuit configured to produce time-domain equalizer coefficients responsive to receiving the frequency-domain equalizer coefficients, wherein the equalizer coefficient calculation circuit is configured to convert the channel frequency response to frequency-domain equalizer coefficients according to the following expression:

$$C(f) = \frac{H_1^*(f)}{\frac{1}{T}\sum_k \left(|H_1(f+k/T)|^2 + \sum_{i=1}^{m}|H_{i+1}(f+k/T)|^2\right) + N_0},$$

where $H^*_1(t)$ is a complex conjugate of a channel frequency response for a serving sector, k is integers, T is a chip or symbol period, and $N_0$ is the power of additive noise, $H_1$ is a channel frequency response of the serving sector at a particular frequency f, k, and T, $H_{i+1}$ is a channel frequency response of an $i^{th}$ interfering sector at the particular frequency f, k, and T, and m is a number of interfering sectors greater than or equal to one.

18. An apparatus for determining coefficients of an equalizer, comprising:
means for receiving a baseband signal to generate a received baseband signal, wherein the baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;
means for despreading the received baseband signal with respect to the pilot channel to generate a despread baseband signal;
means for determining a channel frequency response of a channel impulse response responsive to the despread baseband signal;
means for determining frequency-domain equalizer coefficients based upon the determined channel frequency response;
means for determining time-domain equalizer coefficients based upon the determined frequency-domain equalizer coefficients; and
means for convolving time-domain received samples with the time-domain equalizer coefficients.

19. The apparatus of claim 18, wherein the means for determining time-domain equalizer coefficients based upon the frequency-domain equalizer coefficients comprises:
means for inverse fast Fourier transforming the determined frequency-domain equalizer coefficients.

20. The apparatus of claim 18, wherein the means for determining a channel frequency response of a channel impulse response comprises means for fast Fourier transforming the channel impulse response.

21. The apparatus of claim 18, wherein the means for determining frequency-domain equalizer coefficients based upon the determined channel frequency response can be expressed as follows:

$$C(f) = \frac{H^*(f)}{\frac{1}{T}\sum_k |H(f + k/T)|^2 + N_0},$$

where $H^*(f)$ is a complex conjugate of the determined channel frequency response, k is integers, T is a chip or symbol period, $N_0$ is a power of additive noise, and H is the determined channel frequency response at a particular frequency f, k, and T.

22. The apparatus of claim 18,
wherein the pilot channel is a pilot Walsh channel, and
wherein the data channels are data Walsh channels.

23. The apparatus of claim 18,
wherein the pilot symbols are continuously received over the pilot channel.

24. The apparatus of claim 23,
wherein the pilot channel is a pilot Walsh channel, and
wherein the data channels are data Walsh channels.

25. An apparatus for determining coefficients of an equalizer, comprising:
means for receiving a baseband signal to generate a received baseband signal, wherein the baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;
means for despreading the received baseband signal with respect to the pilot channel to generate a despread baseband signal;
means for determining a channel frequency response of a channel impulse response responsive to the despread baseband signal; and
means for determining frequency-domain equalizer coefficients based upon the determined channel frequency response,
wherein the means for determining frequency-domain equalizer coefficients based upon the channel frequency response can be expressed as follows:

$$C(f) = \frac{H_1^*(f)}{\frac{1}{T}\sum_k \left(|H_1(f + k/T)|^2 + |H_2(f + k/T)|^2 + |H_3(f + k/T)|^2\right) + N_0},$$

where $H^*_1(f)$ is a complex conjugate of a channel frequency response for a serving sector, k is integers, T is a chip or symbol period, and $N_0$ is the power of additive noise, $H_1$ is a channel frequency response of the serving sector at a particular frequency f, k, and T, $H_2$ is a channel frequency response of an interfering sector at the particular frequency f, k, and T, and $H_3$ is a channel frequency response of another interfering sector at the particular frequency f, k, and T.

26. An apparatus for determining coefficients of an equalizer, comprising:
means for receiving a baseband signal to generate a received baseband signal, wherein the baseband signal is a code division multiple access (CDMA) signal including pilot symbols and data symbols; wherein the pilot symbols are received over a pilot channel, wherein the data symbols are received over data channels, and wherein a remote source transmits the pilot channel orthogonal to the data channels;
means for despreading the received baseband signal with respect to the pilot channel to generate a despread baseband signal;
means for determining a channel frequency response of a channel impulse response responsive to the despread baseband signal by performing a first fast Fourier transform on the channel impulse response;
means for determining frequency-domain equalizer coefficients based upon the determined channel frequency response;
means for performing a second fast Fourier transform on received samples to produce transformed samples;
means for multiplying the transformed samples by the determined frequency-domain equalizer coefficients to obtain a product; and
means for inverse fast Fourier transforming the product to obtain time-domain equalized samples.

* * * * *